US006357773B1

(12) United States Patent
Griebel et al.

(10) Patent No.: US 6,357,773 B1
(45) Date of Patent: Mar. 19, 2002

(54) PULL OUT LOCKING CAB STEP ASSEMBLY

(75) Inventors: Francis J. Griebel; Michael K. Yates, both of Lexington, KY (US)

(73) Assignees: Link-Belt Construction Equipment Company, L.P., LLLP; Sumitomo Construction Machinery, both of Lexington, KY (US)

( * ) Notice: Subject to any disclaimer, the term of this patent is extended or adjusted under 35 U.S.C. 154(b) by 0 days.

(21) Appl. No.: 09/271,310

(22) Filed: Mar. 17, 1999

(51) Int. Cl.$^7$ .................................................. B60R 3/02
(52) U.S. Cl. ...................................................... 280/166
(58) Field of Search ........................ 280/30, 163, 164.1, 280/166, 169; 182/88; 105/443, 449

(56) References Cited

U.S. PATENT DOCUMENTS

| | | | |
|---|---|---|---|
| 280,883 A | * 7/1883 | Townsend | 105/449 |
| 1,426,644 A | * 8/1922 | Hopf | 280/164.1 |
| 2,659,902 A | * 11/1953 | Fitzgerald et al. | 280/166 |
| 2,692,636 A | * 10/1954 | Morrison | 280/30 |
| 2,779,525 A | * 1/1957 | Vogel | 280/163 |
| 2,863,594 A | * 12/1958 | Shafer | 280/166 |
| 3,341,223 A | * 9/1967 | Wampfler | 280/166 |
| 3,469,654 A | * 9/1969 | Dohrman | 182/88 |
| 3,671,058 A | * 6/1972 | Kent | 280/166 |
| 3,807,758 A | 4/1974 | Rogge | |
| 3,833,240 A | 9/1974 | Weiler | |
| 3,863,965 A | 2/1975 | Vickers | |
| 3,955,827 A | 5/1976 | Wonigar | |
| 4,185,849 A | 1/1980 | Jaeger | |
| 4,347,638 A | * 9/1982 | Weaver | 182/88 |
| 4,570,962 A | 2/1986 | Chavira | |
| 4,869,030 A | * 9/1989 | Clark | 182/88 |
| 5,228,707 A | 7/1993 | Yoder | |
| 5,284,349 A | 2/1994 | Bruns et al. | |
| 5,342,073 A | 8/1994 | Poole | |

FOREIGN PATENT DOCUMENTS

| | | | | |
|---|---|---|---|---|
| CA | 552882 | * | 2/1958 | ................. 280/166 |
| DE | 3741756 | * | 6/1989 | ................. 280/166 |

* cited by examiner

Primary Examiner—Frank Vanaman
(74) Attorney, Agent, or Firm—King and Schickli, PLLC

(57) ABSTRACT

A pull out step assembly is provided to assist in climbing into or out of a cab of a crane, excavator or similar vehicle. The step assembly includes a pair of brackets carrying forward and rearward rollers and a step having support guides for embracing the rollers to prevent the step from shifting laterally during use. A locking mechanism positively secures the step in place in both the extended and retracted positions. The locking mechanism includes an operating shaft having a pivotal handle positioned below the step for easy access and a dual crank. The crank receives the ends of a pair of reciprocal locking rods that extend transversely to engage corresponding pairs of forward and rearward slots formed in the brackets. A compression spring supplies a biasing force to keep the rods engaged in the slots. To shift the step, the handle is manually rotated either clockwise or counterclockwise to overcome the biasing force and disengage the rods from the respective slots. Once the locking rods are disengaged, the handle may be released from the rotated position and pulled or pushed to move the step to the desired position. Releasing the rotary pressure, allows the ends of the locking rods to ride along the inside face of the brackets until reaching the designated slots. The rods then snap into position and lock the step in place against horizontal in and out movement and assist in lateral stabilization.

10 Claims, 4 Drawing Sheets

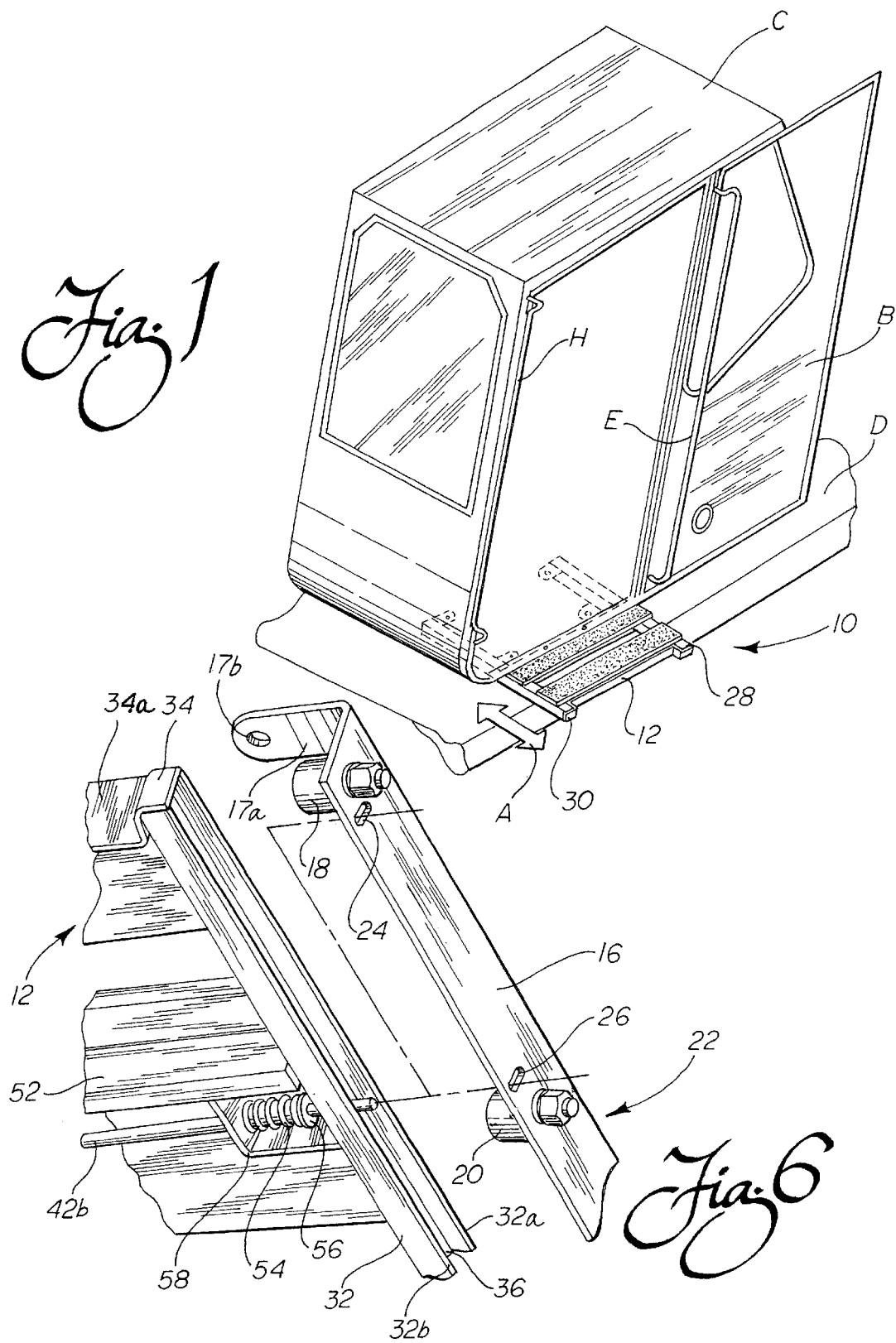

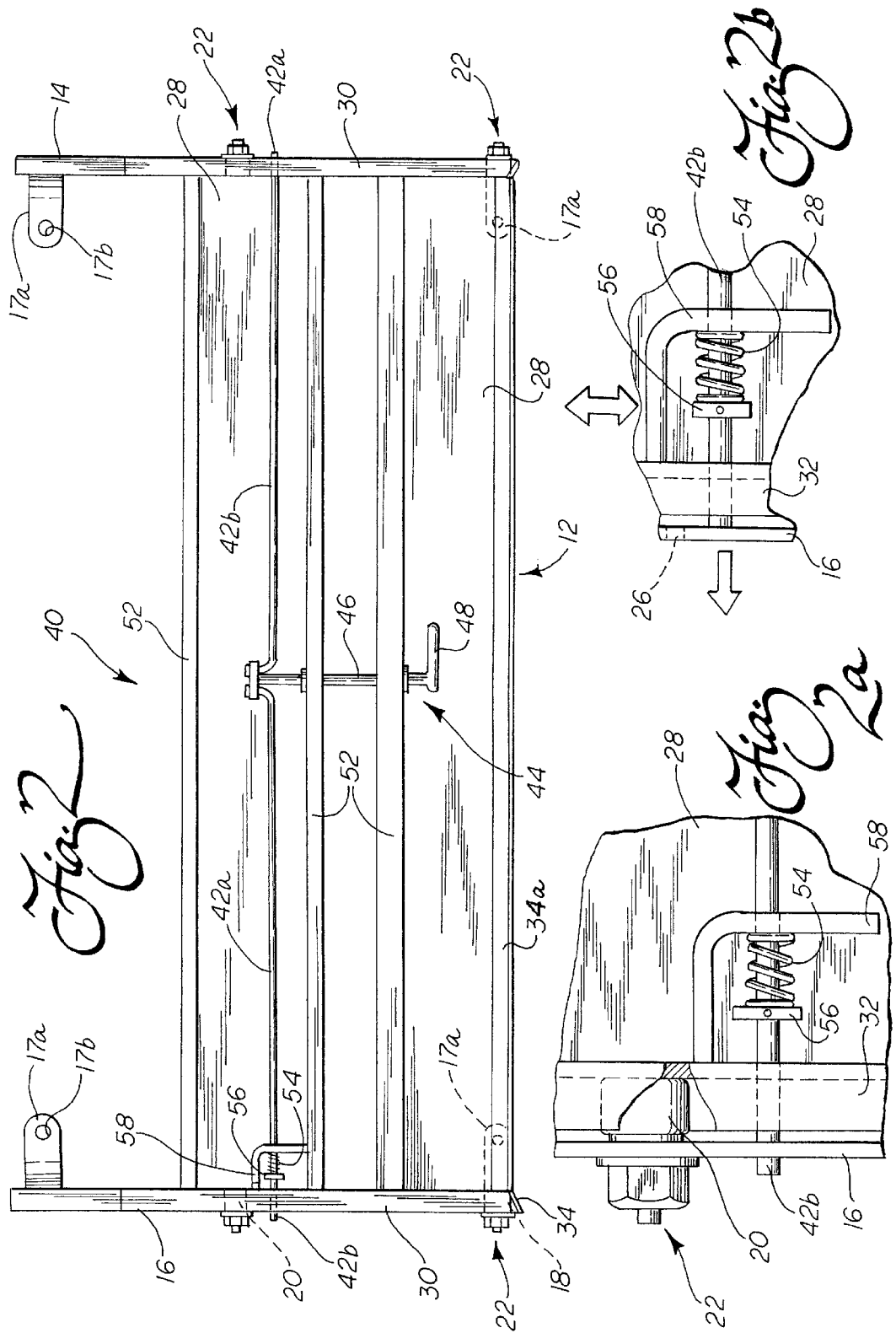

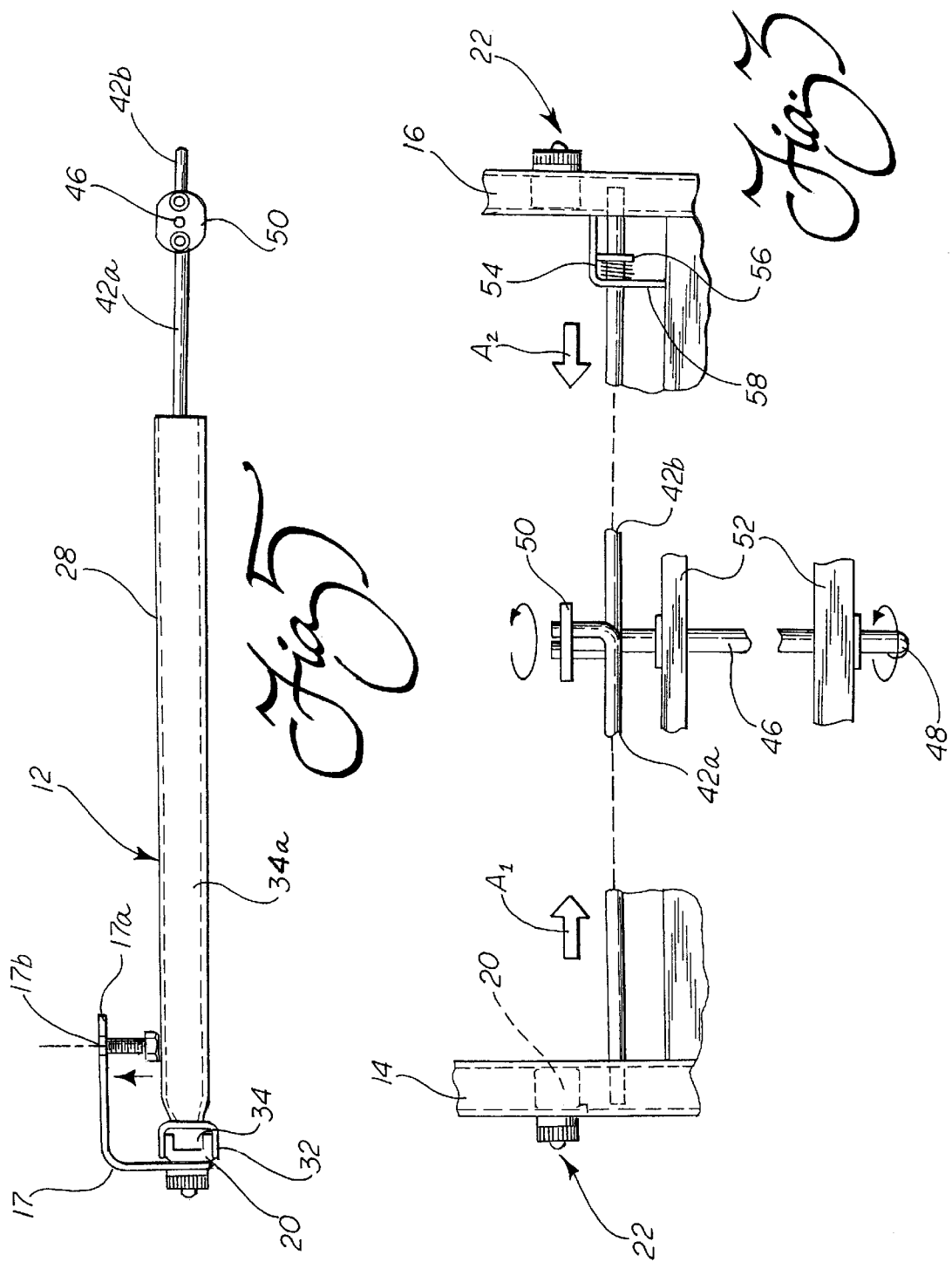

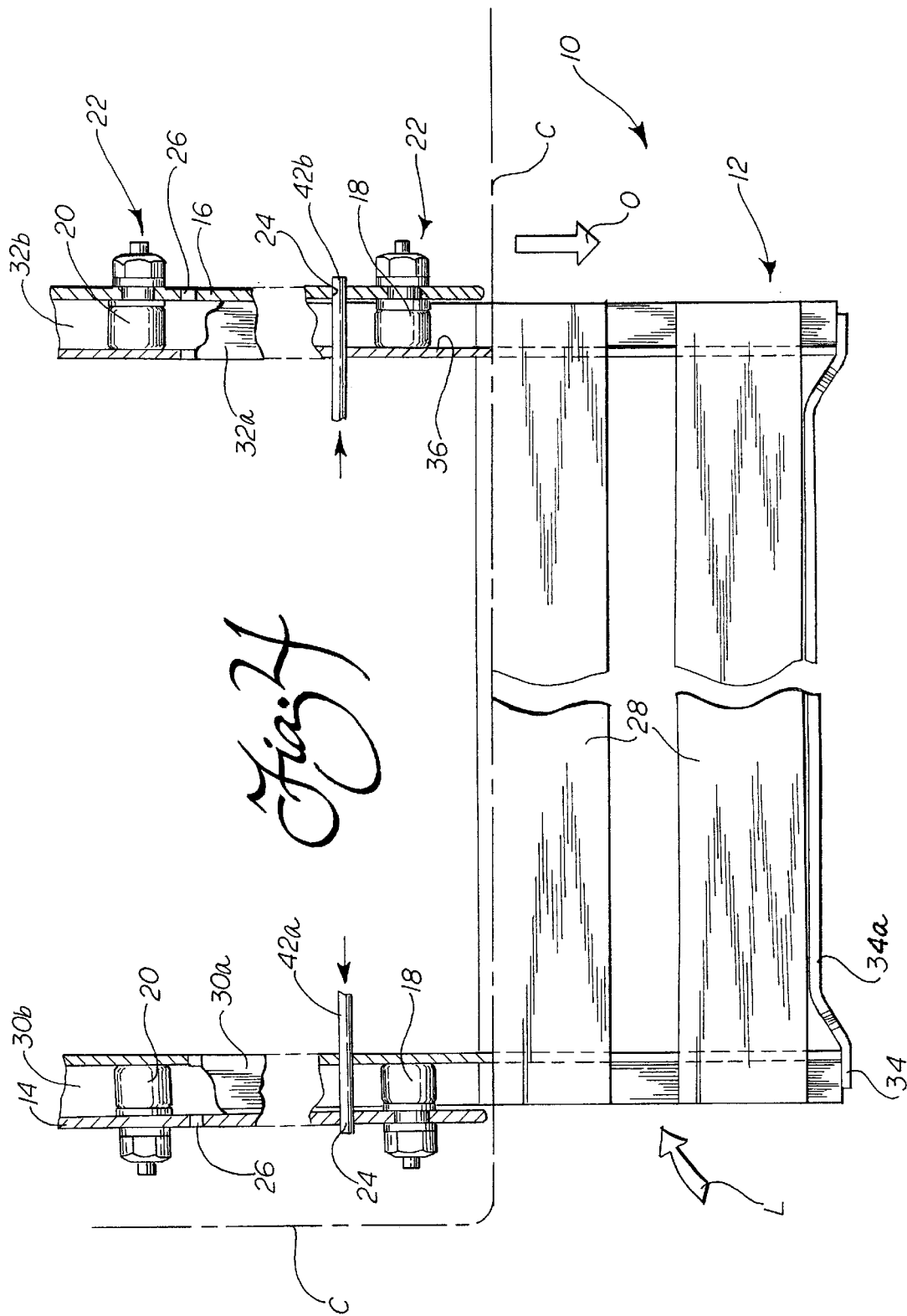

PULL OUT LOCKING CAB STEP ASSEMBLY

TECHNICAL FIELD

The present invention relates generally to retractable steps for assisting in entering or exiting construction equipment cabs, vehicles or the like, and more particularly, to a locking step that is manually pulled to an extended, or operative position from a retracted position under a cab.

BACKGROUND OF THE INVENTION

Steps or ladders for assisting in entering and exiting vehicles are well-known in the art. In the past, these steps or ladders typically extended outwardly and depend downwardly from under the vehicle door. In some instances involving construction equipment without width restrictions, these steps are permanently fixed in an operative position. While such arrangements are also suitable for use on some other types of vehicles, such as passenger vans or truck cabs, construction vehicles with width restrictions require a different approach. For example, truck mounted cranes typically have operator cabs positioned on a rotating turntable or upper works that is mounted to the deck or lower works. To enter the cab, the crane operator must climb directly from the deck through the cab door. This climb is made difficult by the fact that the cab is substantially elevated above the deck and the cab door faces the side of vehicle. Since the entry side of the cab is often extending out only as far as the edge of the deck, which commonly is at or near the maximum width permitted for over-the-road vehicles under federal, state, and local regulations, this means that there is no deck space to step on when the operator is entering or exiting the cab with the boom extending directly forward or rearward. The use of a fixed step that extends outwardly from the cab is not permitted since it would increase the vehicle width beyond what is allowed by these regulations.

Lessening the width of the cab or the upper frame accommodate a fixed step is generally not an option. In most truck mounted cranes, the width of the carrier deck is made as wide as possible to provide greater crane stability. Also, all available space in and under the cab is needed for hydraulic plumbing, controls and other necessary operating mechanisms.

The comfort for the operator is also a concern. Thus, while the cab width is maximized to provide the necessary room for the mechanical equipment, it is imperative at the same time to provide the proper attention to operator ergonomics. All of this has to be accommodated without exceeding the width of the carrier deck.

The alternative of a fixed step that projects forwardly and outwardly is a ladder that depends directly down from the edge of the cab. Although such a ladder does not significantly add to the vehicle width, it is not suitable for use on a truck mounted crane. The fixed step or ladder may interfere with the deck, or structures on the deck, required for operation of the boom as the turntable and cab rotate. It is also difficult to access from the side, as indicated above.

Others in the past have proposed retractable steps that can be stored under the vehicle or cab and extended to an operative position. An example is found in U.S. Pat. No. 5,342,073 to Poole, which discloses a retractable step that is mounted on the underside of a passenger van. The step is provided with side support tubes that slide on horizontally extending cross guides. This arrangement permits the step to move horizontally between the retracted and extended positions. Plates at the inner ends of the support tubes trap the step adjacent the end of outward, extended travel to prevent inadvertent removal.

One disadvantage of the arrangement proposed in the '073 patent is that the step is held in the retracted position only by thin, spaced stops formed on the support tubes. If the vehicle carrying the retractable step is subjected to significant vertical jarring, such as is created when potholes, speed bumps, or the like are encountered, the step can inadvertently move into the extended position Of course, this lack of a positive locking arrangement suggests having to use stop gap measures, such as the use of a bungee cord or the like to hold the step in place.

Another disadvantage is that there is no lateral stability in the '073 design. Indeed, the step is intended for use by people entering only over the outer or front edge. Stepping on the side of the step would likely cause sudden sidewise shifting along the cross guides. This, in turn, could lead to a sudden loss of balance of the person using the step.

Other types of folding or retractable steps have also been proposed, but most of these have a large number of component parts, and are also actually restricted to use for entry over the outer or front edge. This is so since the part of the operating mechanism extends above the tread on the sides of the step providing direct foot interference; see, for example, U.S. Pat. No. 3,955,827 to Wonigar. Still others require relatively long and thin depending support arms and slotted levers that are also subject to sudden shifting or swinging, and thus also the risk of loss of balance when stepping onto the side of the tread of the step. Also, the arms and levers are subject to bending and over time becoming jammed rendering the step inoperative; see U.S. Pat. No. 5,284,349 to Bruns et al.

Accordingly, a need is identified for a retractable step that can be manually extended from under a vehicle, crane or excavator cab, or the like. In the operative position, the step would extend substantially in the horizontal plane, have a very low profile and be stable for side entry onto the tread, thus making it suitable for use with a cab mounted on a turntable supported on a truck chassis. To hold the step in both the extended and retracted positions, a manually operable mechanism would be provided to securely lock the step in place. The step would also be simple in design and inexpensive to manufacture. Ease of installation would allow the step to be retrofitted onto existing cabs or other desired locations without significant time or effort. Overall, the locking retractable step would result in an improvement in stability and reliability over those known in the art, and would be particularly adapted for use on crane/excavator cabs or the like.

SUMMARY OF THE INVENTION

Accordingly, it is a primary object of the present invention to provide an improved step assembly. for mounting under a crane cab or other vehicle, and wherein the step can be manually pulled from a retracted position to an extended, operative position for assisting in climbing into or out of the cab from any direction.

Another object is to provide a pull out step assembly including a step that has a low profile and moves substantially horizontally to an extended position, such that during rotation of the crane cab, it does not interfere with existing structures required for operation of the crane.

Still another object of the present invention is to provide a pull out step assembly that includes a positive locking mechanism for holding the step securely in place in both the extended and retracted positions.

Still another object of the present invention is to provide a pull out step assembly that incorporates a step that is inherently stable to permit stepping on the side of the tread, as required by entry or exit of some cranes or the like.

Yet another object of the present invention is to provide a pull out step assembly that is inexpensive to manufacture, and sturdy and reliable in use.

A further object of the present invention is to provide a pull out step assembly that is simple to install and easily retrofitted onto locations where a retractable step is desired without extensive modification to the existing structure.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved pull out step assembly is mounted under the cab of a crane or excavator, and is manually extendable to an operative position for assisting in climbing into or out of the cab. The step assembly has a low profile when mounted under the cab, and the step extends substantially horizontally to an extended position so as to avoid interfering with the rotation of the crane cab.

Advantageously, the step assembly also includes a built-in, manually operable locking mechanism that positively secures the step in place in both the extended and retracted position. Moreover, the step is designed to be stable when the tread is stepped on from the side. Lateral shifting of the step is prevented due to the unique design of the retracting mechanism.

Furthermore, the step assembly is relatively simple in construction and is easily retrofitted onto existing crane cabs. Although the step assembly is described as being particularly adapted for use on the cab of a crane, excavator or similar location, it should be appreciated that it is possible to adapt the invention described herein for use on other types of vehicles or any other locations where a retractable step, particularly with lateral stability, may be desirable.

In the broadest aspects of the invention, the locking cab step assembly includes a pair of elongated L-shaped brackets for mounting to the underside of a cab or the like. The brackets are provided with opposed forward and rearward slots for receiving the ends of laterally extending locking rods. Upon engagement with the appropriate pair of the forward/rearward slots, the step is held in place in a positive, secure manner in either the extended or retracted positions, respectively.

The step is mounted between support guides, such as C-shaped channel members, that embrace pairs of side support rollers on the brackets that permit the step to move in and out in the horizontal plane, but advantageously prevent lateral shifting during use. This mounting allows the step to be pulled from the retracted to the extended position for use in assisting in entering or exiting the cab and returned to the retracted position when not in use to comply with regulations on maximum vehicle width. When the operator steps on the tread from any direction, including from the side, the step remains secure and stable to insure the operator's balance as the cab is entered or exited.

The locking mechanism, which also enhances the lateral stability, includes a pair of reciprocal locking rods that extend in a transverse direction relative to the C-shaped channel members of the step and the mounting brackets. To provide the desired locking function, the ends of the locking rods engage the rearward slots formed in the brackets when the step is in the retracted position and the forward slots when the step is in the extended, or operative position. Means for manually moving the reciprocal locking rods into and out of engagement with the respective pair of slots is also provided. Thus, as described further below, manually disengaging the reciprocal locking rods from the respective slots allows the step to freely move between the extended and retracted positions. The slots are also formed having an oversized vertical dimension to compensate for slight dimensional and operational variations between the channel members and the support rollers.

The C-shaped channel members on the sides of the step provide a three-sided bearing surface for contacting and fully embracing the support rollers. Thus, when the reciprocal locking rods are disengaged, the step can be manually pushed or pulled as the rollers rotate and the channel members move effortlessly in and out. The side faces of the rollers engage the cross web of the respective C-shaped channel member, thus embracing the channel members and preventing any deleterious lateral shifting that could cause a sudden loss of balance of the operator as the tread of the step is engaged from the side. A stop may be provided at the forward and rearward ends of both channel members to prevent the step from inadvertently becoming disengaged.

Also in the preferred embodiment, the reciprocal locking rods move into and out of engagement with the forward and rearward slots through use of a operating shaft extending toward the outer edge of the step. One or more reinforcing cross members extend along the underside of the step and provide bearing apertures for the operating shaft. A pivotal handle is provided at the proximal or outer end to rotate the shaft and is easily accessible from under the step. At the opposite or distal end of the operating shaft, a dual crank is provided that receives the ends of the reciprocal locking rods. Thus, as should be appreciated, turning the handle either clockwise or counterclockwise from a resting position rotates the dual crank, which in turn moves the ends of the locking rods out of engagement with the respective slots.

At least one of the locking rods is preferably provided with a biasing element, such as a compression spring, to force the rods in the direction of the respective bracket. Thus, once the rotary pressure on the handle is released after the rods are disengaged from the respective slots, the biasing force supplied by the compression spring lightly presses the rods against the inside face of the brackets. When the step is moved in either direction, such that the locking rods reach the slots, the rods automatically shift into engagement to securely lock the step in place. The step is then ready for use in climbing into the crane cab. Advantageously, because the step extends substantially horizontally and has a low profile, it can remain in the extended position during rotation of the crane cab without interfering with existing structures on the carrier deck. Only when movement to anotherjob site is required is it necessary to retract the step.

As should be appreciated, to retract the step, the handle is manually rotated such that the locking rods move inwardly and disengage from the forward slots. Once the slots are cleared, the rotary pressure exerted on the handle can be released. The step is then pushed inward by the handle with the ends of the locking rods riding along the support bracket. When the locking rods reach the rearward slots, the biasing force provided by the compression spring causes the rods to shift into engagement and hold the step securely in place in the retracted position.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention.

In the drawings:

FIG. 1 is a perspective view of a crane cab mounted on the deck of a carrier truck showing the step assembly of the present invention mounted under the cab with the step in the extended position;

FIG. 2 is a bottom plan view of the step assembly of the present invention with the step in the retracted position, including the locking mechanism that positively secures the step assembly in both the extended and retracted positions;

FIG. 2a is an enlarged, cutaway bottom view of the step assembly with the step in the retracted position illustrating the locking rod at one side engaged in the respective slot formed in the support bracket;

FIG. 2b is a similar enlarged cutaway view with the locking rod in the disengaged position, with the compression spring pressing the rod lightly against the inside face of the bracket as the step is pulled or pushed to another position;

FIG. 3 is a top view illustrating in detail the operation of the locking mechanism to disengage the reciprocal locking rods from the rearward slots;

FIG. 4 is a top view showing the step positively locked in the extended position and further including a partial cross-section of the channel members illustrating the manner in which the rollers are embraced to prevent the step from shifting laterally when stepped on from the side;

FIG. 5 is a front view of the right side of the step assembly, with the left side cutaway to expose in part the dual crank and locking rods which in part form the locking mechanism for positively locking the step in both the extended and retracted positions; and FIG. 6 is a cutaway, exploded perspective view looking up from the bottom at the left side of the step assembly, illustrating in particular the interaction between the step, the rollers mounted on the brackets, and the forward and rearward slots.

Reference will now be made in detail to the present preferred embodiment of the invention, as example of which is illustrated in the accompanying drawings.

DETAILED DESCRIPTION OF THE INVENTION

Reference is now made to FIG. 1, showing the pull out cab step assembly 10 of the present invention mounted under a crane or excavator cab C. Step 12 is locked in the extended position, as shown. It is movable in and out with respect to the cab C when the locking mechanism is released, as indicated by the double headed action arrow A.

The cab C is supported on a turntable that rotates 360° (not shown) to permit the boom, articulated excavator arm or the like (not shown) to move as directed for lifting, digging and/or moving a load. The turntable is mounted on the deck D of a truck chassis (not shown). As illustrated, the side of the deck D is vertically aligned with the door B and the side face of the cab C, which makes it difficult for the operator to enter the cab C. Using a grab handle H of the type that is typically mounted adjacent to the cab door B. and with the assistance of the step assembly 10 of the present invention, the operator can easily enter the cab C. Although the step assembly 10 is described and illustrated in this particular environment, it should be appreciated that this is done for purposes of describing a preferred embodiment of the invention only. Those skilled in the art will recognize that the step assembly of the type disclosed may be useful on types of vehicles other than a crane or excavator and at other locations where a retractable step is desirable.

As best understood by viewing FIGS. 2–6 together, the cab step assembly 10 includes the movable step 12 that is supported by a pair of spaced support brackets 14, 16. These brackets 14, 16 are adapted to be secured to the underside of the cab C. The brackets 14, 16 are L-shaped and include spaced or continuous upper flange 17. Mounting bolts (one shown in FIG. 5) secure the flanges 17 by engaging threaded bores formed in the underside of the crane cab C. The bolts attach by way of bolt receiving apertures 17b. In this manner, four or more bolts can securely hold the brackets 14, 16 in the fixed horizontal position required for implementation of the operation of the step assembly 10. Other types and/or additional fasteners can be utilized where needed.

In the preferred embodiment, the brackets 14, 16 also include pairs of opposed forward and rearward rollers 18, 20 for providing the in and out movement described above, as well as for providing the desired lateral stability to the step. These support rollers 18, 20 are mounted on stub shafts 22 that extend through the sides of the brackets 14, 16 (see FIGS. 2a and 4).

The step 12 includes one or more treads 28 for stepping onto when entering or exiting the cab C. The treads 28 are preferably spaced apart and carried on opposed support guides forming a part of the step 12. In the preferred embodiment, the guides take the form of C-shaped channel members 30, 32, and are positioned such that the open side faces receive both the forward and rearward support rollers 18, 20 (see FIG. 4).

Specifically describing the arrangement at one side of the step 12, as also illustrated in FIG. 6, the upper and lower flanges 32a, 32b of the channel member 32 provide bearing surfaces for the rollers 18, 20 and allow the step 12 to move horizontally in and out with respect to the cab. These flanges 32a, 32b, in combination with the cross webs 36 of the channel members 30, 32 serve to filly embrace the rollers 18, 20. This advantageously serves to stabilize the step 12. Most importantly, this arrangement prevents the step 12 from shifting laterally during use, particularly as the operator steps onto the tread 28 from the side. The flanges 32a, 32b, and cross webs 36 of the channel members 30, 32 serve to closely engage the rollers 18, 20 from all three directions. The rollers 18, 20 and/or the channel members 30, 32 may be lubricated. Substantially free in and out movement provided by rolling action on the rollers 18,20 is thus assured when the locking mechanism is released. Most importantly, the end face of the rollers 18, 20 closely abuts against the cross web 36 so that lateral stability is assured at all times. The rollers 18 and 20 roll against either the upper or lower flanges 32a, 32b during the in and out movement for retracting or extending the step 12.

Corresponding pairs of forward and rearward slots 24, 26 are formed adjacent to each pair of the support rollers 18, 20 in the sides of the brackets 14, 16 (see FIGS. 4 and 6). As illustrated in FIG. 6, the slots 24, 26 preferably have an oversized vertical dimension to compensate for slight dimensional and operational variations between the channel members 30, 32 and the support rollers 18, 20. Each channel member 30, 32 is also provided with a forward stop 34 and a rearward stop (not shown) that trap the step 12 to insure that it cannot be inadvertently removed. The stops 34 may either be integrally formed at the ends of the channel members 30, 32, or as illustrated, may form the ends of a horizontally extending face member 34a, which extends across the front of the step 12.

As shown in FIG. 2, the step assembly 10 also includes a locking mechanism 40 for positively securing the step 12 in place in both the extended and retracted positions. The locking mechanism 40 includes a pair of reciprocal locking rods 42a, 42b and means for moving these rods into and out of engagement with the oversized slots 24, 26. The moving means, which is generally designated by reference numeral 44, preferably includes an operating shaft 46 having a pivotal handle 48 at the front or proximal end, and a dual crank 50 at the opposite or distal end. The handle 48 is positioned below and near the front portion of the step 12 to provide easy access from the underside in both the in and out, retracted and extended positions. The rotary handle is most conveniently reached by the operator when the crane operator is still standing on the ground.

The curved end of each locking rod 42a, 42b is received and held in dual crank 50 at the distal end of the operating shaft 46 (see FIG. 3). From the connection point at the center of the dual crank 50, the operating shaft 46 extends forward and through bearing apertures formed in reinforcing cross members 52 that are attached to the underside of the step treads and to the cross webs 36 of the channel members 30, 32. The operating shaft 46 rotates in response to the grasping and applying rotary pressure to the handle 48. Because of the use of the dual crank 50, operation of the locking rods 42a, 42b can be implemented by rotation of the handle 48 in either the clockwise or counterclockwise direction.

Thus, as FIG. 3 shows in detail, the structure and basic operation of the locking mechanism 40 should now be clearly evident. When the handle 48 is manually turned, as illustrated by the forward rotary action arrow, the operating shaft 46 is rotated. This rotation turns the dual crank 50, as indicated by the rear action arrow to cause the ends of the reciprocal locking rods 42a, 42b to move out of engagement with the rearward slots 26 in each bracket 14, 16 (see opposed action arrows $A_1$ and $A_2$). In the preferred embodiment, the locking rods 42a, 42b are biased toward the locking position by a compression spring 54 placed at the end of at least one of the rods 42a, 42b. More specifically, and as illustrated in detail in FIGS. 2–2b, the compression spring 54 is mounted between a washer 56 fixed in position near the end of the rod 42b and an L-shaped bracket 58 extending between the cross member 52 and the channel member 30. When the handle 48 is rotated, the lateral, inward translation of the locking rod 42b moves washer 56 inwardly, which compresses the spring 54 against the leg of the bracket 58 (see FIG. 3).

It should be appreciated that once the end of the locking rods 42a, 42b are disengaged from the respective rearward slots 26, the step 12 may be pulled forward with ease. Rotary pressure on the handle 48 can be released as soon as the slots 26 are cleared. As best depicted by the action arrows in FIG. 2b, the step 12 continues to move forward with the end of the rods sliding against the inside face of the respective brackets 14, 16. When the forward slots 24 are reached, the biasing force supplied by spring 54 causes the ends of the rods 42a, 42b to snap into the locking engagement, thereby positively locking the step 12 in the extended or out position with respect to the cab C (see FIG. 4, noting in particular dash-dot outline C representing the outside edge of the cab).

Once in the extended position, as shown in FIGS. 1 and 4, the step 12 is ready for use. To easily enter the cab C, even when the boom or excavator arm is in the directly forward or rearward position, the crane or excavator operator stands on the deck D in front of the cab C and as the grab handle H is grasped, the operator's foot can be placed on the treads 28 of the step 12. The action of stepping on the side of the step 12 creates a significant lateral force, as indicated by action arrow L in FIG. 4, but the step 12 is prevented from shifting laterally by the close tolerance fit of the rollers 18, 20 within the channels 30. Of specific importance, the side faces of the rollers on the opposite side as viewed in FIG. 4, press against the cross web 36 of the channel 32. As a result, little or no side shifting movement is experienced by the operator and there is no loss of balance. The top and bottom flanges 30a, 32a and 30b, 32b of the channel members 30, 32 acting against the periphery of the rollers 18, 20 also prevent excessive tipping or skewing movement of the step due to the cantilever effect as the weight of the operator is applied on the right side. To add additional stability, the locking rods 42a, 42b are held captive in the slots 24, adding two other points of support. As the rods can move only a short distance before reaching the ends of the slots, and thus bottoming out, the rollers 18 are assured of receiving the greatest share of the load, and bending of the ends of the rods is prevented.

Thus, when the operator steps on the step 12 from any direction, including from the side, the step 12 remains secure and stable to insure the operator's balance as the cab is entered. Once firmly standing on the step 12 and still grasping the rail H, the operator can easily slide the door B open by the handle E.

The crane, excavator or other vehicle may then be operated as normal. The step 12 can remain in the extended position at all times. As should be appreciated, this is possible because the step assembly 10 has a very low profile and the step 12 does not depend downward from the cab C. Therefore, it does not interfere with structures on the deck D during the rotation of the turntable and cab C to place the boom, digging arm or the like in the desired position.

To exit the cab C when the boom/arm is in the directly forward or rearward position, such as is the case when it is ready for road travel, the step 12 in conjunction with the grab handle H can be used to climb down onto the deck D. Again, the step 12 remains positively locked in place and secure. It cannot shift laterally and is stabilized because the channel members 30, 32 fully embrace the rollers 18, 20 on three sides. The locking rods 42a, 42b are engaging and holding in their slots 24 to assist in the stabilization of the step.

After climbing down from the deck D to the ground, the operator may then grasp and rotate handle 48 to overcome the compressive force provided by the spring 54 and disengage the locking rods 42a, 42b. The handle 48 is then used to push the step inwardly. During this operation, the manual rotary pressure on the handle 48 may be released, allowing the compression spring 56 to press the ends of the locking rods 42a, 42b against the inside faces of the brackets 14, 16. This can best be seen in FIG. 2b, illustrating the rod 42b engaging the inside face of the bracket 16 as the step 12 is pushed inwardly toward the retracted position. When it reaches the rearward slot 26, the biasing force provided by the spring 54 causes it to shift or snap into engagement. The step 12 is thus securely held in a retracted position by locking rods 42a, 42b, and the crane/excavator is ready for transport to the next job site.

Obvious modifications are possible without departing from the basic principles of the invention described above. For instance, although the brackets 14, 16 are suitable for mounting directly to the understructure of many construction vehicles, such as existing crane/excavator cabs, it may be necessary or desirable to include a mounting apron (not shown). The apron is secured to the underside of the cab C to provide a level mounting surface for the support brackets 14, 16 and ensure that a secure mounting is made without requiring any major structural modification the underside of the cab C itself This adds to the design simplicity of the overall step assembly 10 and makes retrofitting to existing vehicles easier.

Furthermore, although in the preferred embodiment the pairs of opposed rollers 18, 20 are used, it should be appreciated that the step 12 and the support brackets 14, 16 may be slidably mounted in other equivalent ways, such as by using a tongue and groove, dovetail, or other equivalent type of arrangement that permits smooth translation in the horizontal plane.

In summary, the improved cab step assembly 10 is provided for assisting in climbing into or out of the construction vehicle cab C. The step assembly 10 includes the pair of support brackets 14, 16 for the step 12 having spaced treads 28. The support guides, such as C-shaped channel members 30, 32, support the treads 28 along the sides (see FIGS. 1 and 4). The brackets 14, 16 include opposed roller pairs 18, 20 that permit the step 12 to move in a horizontal plane. The manner in which the channels 30, 32 embrace the rollers 18, 20 to stabilize the step 12 is an important feature. The three-sided roller engagement (top, bottom and side face) prevents the step 12 from laterally shifting during use, even when stepped on from the side. The built-in locking mechanism 40 is provided for positively locking the step 12 in both the extended and retracted positions and to assist in the stabilization function. The pivotal handle 48 for the operating shaft 46 is positioned at the front of and below the step 12 for easy access (see FIG. 2). The dual crank 50 at the distal end of the shaft 46 receives the ends of the reciprocal locking rods 42a, 42b. The corresponding forward and rearward slots 24, 26 formed in the brackets 14, 16 receive the ends of the locking rods 42a, 42b (see FIG. 4). The compression spring 54 on one of the locking rods provides a biasing force to keep both in the locking position in their respective slots 24, 26 (see FIGS. 2a and 2b). In operation, rotating the handle 48 clockwise or counterclockwise overcomes this biasing force and disengages the rods 42a, 42b from the slots 24, 26 (see FIG. 3). Once disengaged, the handle 48 is pulled or pushed to move the step 12 toward the desired position. The ends of the rods 42a, 42b can ride along the inside face of the brackets 14, 16 until reaching the slots 24 or 26, whereupon they shift into engagement and lock the step 12 in place (note rod 42b in FIG. 2b). Advantageously, the step 12 has a low profile and may be left in the extended position during rotation of the cab C to position the boom or excavator arm.

The foregoing description of a preferred embodiment of the pull out locking cab step assembly 10 of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A locking cab step assembly that is manually shifted between an extended position and a retracted position under a vehicle cab, comprising:
    a pair of opposed support brackets;
    a step mounted to a pair of non-pivotal support guides, said support guides engaging said support brackets for longitudinal movement and preventing said step from shifting laterally a significant degree during use; said support brackets include corresponding pairs of forward and rearward rollers, said support guides bearing upon and embracing said rollers for rolling assist of said movement and to prevent said step from shifting laterally; said support guides defining channel members including substantially equal, laterally extending upper and lower flanges to embrace said rollers and a side cross piece positioned in close abutting relation to the end faces of said rollers; and
    a locking mechanism for directly engaging both said support brackets to positively secure said step in both the extended and retracted positions, said locking mechanism also assisting in preventing said step from shifting laterally.

2. The step assembly of claim 1, wherein said locking mechanism includes a handle to provide direct manual shifting of said step.

3. The step assembly according to claim 1, wherein each of said support brackets include corresponding forward and rearward slots.

4. The step assembly according to claim 3, wherein said locking mechanism includes a pair of reciprocal locking rods and means for moving said reciprocal locking rods laterally into and out of engagement with said forward and rearward slots of said support brackets.

5. The step assembly according to claim 4, wherein said means for moving said reciprocal locking rods includes an operating shaft having a pivotal handle at a proximal end and a dual crank at a distal end, said dual crank receiving an end of each said reciprocal locking rod, whereby rotating said handle in either a clockwise or counterclockwise direction rotates said dual crank and disengages said locking rods from said forward or rearward slots, respectively.

6. The cab step assembly according to claim 5, wherein at least one of said reciprocal locking rods is provided with biasing means for shifting said locking rods into engagement with said forward or rearward slots when said handle is released.

7. The cab step assembly according to claim 6, wherein said biasing means is a compression spring.

8. A locking, pull out cab step assembly for assisting in climbing into or out of a vehicle cab, comprising:
    a pair of support brackets for mounting to the underside of the cab having corresponding forward and rearward slots, each of said support brackets having forward and rearward rollers;
    a step mounted to a pair of opposed non-pivotal channel members, said channel members providing a bearing surface for and embracing said forward and rearward rollers for longitudinal movement and stabilizing said step against significant lateral movement; each of said channel members including substantially equal, laterally extending upper and lower flanges to embrace said rollers for rolling assist of said movement and a side cross piece positioned in close abutting relation to the end faces of said rollers; said flanges and cross piece of each channel member forming said bearing surface; and a locking mechanism including a pair of reciprocal locking rods for directly engaging both said slots to positively secure and assist in lateral stabilization of said step, an operating shaft having a pivotal handle and a dual crank for receiving an end of each of said reciprocal locking rods;

whereby rotating said handle clockwise or counterclockwise disengages said reciprocal locking rods from said respective slots to allow said step to move between longitudinal extended and retracted positions.

9. The step assembly according to claim 8, wherein said slots are formed having an oversized vertical dimension to compensate for dimensional variations between said channel members and said support rollers and accommodate limited operational movement during use.

10. The step assembly according to claim 8, further including a compression spring connected to at least one of said locking rods, said spring biasing each of said locking rods in the direction toward the respective support bracket.

* * * * *